(12) United States Patent
Goodbody et al.

(10) Patent No.: US 8,484,102 B2
(45) Date of Patent: Jul. 9, 2013

(54) AUTOMATED ACCRUAL ACCOUNT RECONCILIATION

(75) Inventors: Gerald Goodbody, Castro Valley, CA (US); Shyamsundar Santhanam, Hyderabad (IN); Srinath Reddy Kayitha, Hyderabad (IN); Sunil Sama Reddy, Belmont, CA (US)

(73) Assignee: Oracle International Corporation, Redwood Shores, AZ (US)

( * ) Notice: Subject to any disclaimer, the term of this patent is extended or adjusted under 35 U.S.C. 154(b) by 552 days.

(21) Appl. No.: 12/392,159

(22) Filed: Feb. 25, 2009

(65) Prior Publication Data

US 2010/0217692 A1   Aug. 26, 2010

(51) Int. Cl.
*G06Q 40/00*   (2012.01)

(52) U.S. Cl.
USPC .......................................................... 705/28

(58) Field of Classification Search
USPC .......................................................... 705/34
See application file for complete search history.

(56) References Cited

U.S. PATENT DOCUMENTS

| 2003/0074244 A1* | 4/2003 | Braxton | 705/7 |
| 2007/0198376 A1* | 8/2007 | Zhu et al. | 705/30 |

* cited by examiner

*Primary Examiner* — Shay S Glass
(74) *Attorney, Agent, or Firm* — Miles & Stockbridge P.C.

(57) ABSTRACT

Systems and methods of a reconciliation engine for accrual accounts associated with purchase order documents are provided. The reconciliation engine applies a set of business rules a set of purchase order documents for which the accrual account is nonzero. The business rules allow the system to determine discrepancies that are inconsequential and may be disregarded. Those accounts are marked for clearance and automatically cleared. An interface is provided to reverse the automatic clearance, as well as to adjust accrual accounts manually.

13 Claims, 8 Drawing Sheets

Search Results: Accrual Clearing Rules

☐ Maximize

| Rule Name | Description | Priority | Accrual Clearing Status | End Date |
|---|---|---|---|---|
| Clear Closed POs | Auto clearing of POs with Stat | 1 | Reversed | |
| Absolute Balance Rule | Clear balances less than 100 | 2 | Reversed | |
| | | | Not Cleared | |
| | | | Reversed | |
| | | | Both | |

Manage Receipt Accrual Balances

Search: Open Accrual Balances | Search: Adjusted Accrual Balances

Search

* Required fields

*Business Unit: Vision Operations
*Document Type:

Account:

Advanced | Saved Searches

Search | Reset | Save...

600

610

Search Results : Open Accrual Balances

Adjust Balances

| Document Number | Line | Shipment | Distribution | Last Activity Date | Receipt value (USD) | Invoice value (USD) | Accrual Balance (USD) | Select for Adjustments | Accrual Account | Item | Supplier |
|---|---|---|---|---|---|---|---|---|---|---|---|
| 4321 | 1 | 1 | 1 | 05-Jan-2005 | 7229 | 2000 | 5229 | ☐ | 01-000-2220-0000-000 | SB68415 | Advanced Network Device |
| 5114 | 1 | 2 | 1 | 04-Jan-2005 | 3298 | 0 | 3298 | ☐ | 01-000-2220-0000-000 | AS1886 | Advanced Network Device |
| 5117 | 2 | 1 | 1 | 03-Jan-2005 | 1154 | 0 | 1154 | ☐ | 01-000-2220-0000-000 | AS1886 | Advanced Network Device |
| INV-1234 | | | | 02-Jan-2005 | 0 | 1000 | (1000) | ☐ | 01-000-2220-0000-000 | | Advanced Network Device |
| INV-1255 | | | | 02-Jan-2005 | 0 | 2000 | (2000) | ☐ | 01-000-2220-0000-000 | | Advanced Network Device |

630

620

640

5117:Details

| Transaction Type | Transaction Number | Transaction Date | Transaction Quantity | UOM | Transaction Amount | Accounted Amount | Adjustment Mode |
|---|---|---|---|---|---|---|---|
| Receive | 17870 | 01-Jan-2005 | -10 | Each | (4789.33) EUR | (4789.33) USD | |
| Receive | 17871 | 01-Jan-2005 | -10 | Each | (4789.33) EUR | (4789.33) USD | |
| Return to Vendor | 17872 | 01-Jan-2005 | 5 | Each | 2349.66 USD | 2349.66 USD | |
| Invoice | INV-5377 | 01-Jan-2005 | 10 | Each | 1800 USD | 1800 USD | |
| Accrual Clearing | CLG1112 | 05-Jan-2005 | | | 200 USD | 200 USD | Manual |

AUTOMATED ACCRUAL ACCOUNT RECONCILIATION

FIELD OF THE INVENTION

One embodiment is directed to business accounting, and more particularly directed to a rules engine automating business rules.

BACKGROUND INFORMATION

Procure-To-Pay ("PTP") is a key business process of any company engaged in the business of trading or manufacturing. Typically, the business events in this process start with the receipt of goods for inspection and the delivery of goods to a warehouse location, followed by the recognition of payment liability for a supplier invoice. The process ends with final payment to the supplier and recognition that the PTP process is complete. There may also be other events such as a return of goods to a supplier, recognition of credit from the supplier for returns or discounts, and settlement with the supplier for credits as part of a reverse logistics process.

These business events are typically processed by more than one business application module of any Enterprise Resource Planning ("ERP") software. For example, receipts may be processed in an inventory module, invoices may be processed in an Accounts Payable module, payments may be processed in a Cash Management module, etc. Generally accepted accounting principles (accrual basis of accounting) mandates the creation of financial accounting entries when the business event happens. Table 1 below represents a typical chain of financial entries, or a Purchase Order Document ("POD"), showing a business event, the debits and credits to accounts as a result of the event, and an ERP module that may handle the task of recording the financial accounting entries.

TABLE 1

| Event | Dr/Cr | Account | Explanation | ERP Module |
|---|---|---|---|---|
| Receipt | Dr | Receiving Inspection | Represent value of goods in receiving bay | Inventory/Receipt Accrual Accounting System |
|  | Cr | Supplier Accrual | Provisional recognition of liability based on purchase order price pending invoice from supplier |  |
| Deliver to warehouse | Dr | Inventory | Represent the value of goods delivered to warehouse | Inventory/Cost Accounting System |
|  | Cr | Receiving Inspection | Wash the Receiving inspection as goods moved out of receiving bay |  |
| Invoice from supplier | Dr | Supplier Accrual | Wash the Supplier accrual as invoice from supplier is accounted | Accounts Payable System |
|  | Cr | AP Liability | Recognize final liability to supplier based on supplier invoice |  |
|  | Dr/Cr | Invoice Price Variance | The different between provisional liability and the final liability |  |
| Payment to supplier | Dr | AP liability | Wash the AP liability as payment is made to supplier | Accounts Payable System |
|  | Cr | Bank | Reduce balance from bank account from where payment is made to supplier |  |

Ideally all the receipts made should be invoiced and the balance in the Supplier Accrual account should be zero at the end of the PTP cycle for a POD. However, there could be balances in accrual accounts (i.e., an account that recognizes revenues and expenses when they are earned or incurred regardless of the actual cash inflow/outflow) due to the following possible reasons: not all receipts have been invoiced but the supplier has settled; less than the invoiced quantity was received but the supplier has settled; there is a small quantity/amount difference due to rounding differences across application modules; a receiving clerk mistakenly failed to enter the receipt; an invoice clerk mistakenly failed to enter the invoice from the supplier, etc. One of ordinary skill in the art will recognize there could be many various other reasons why the accrual account value is incorrect.

The balance in accrual accounts should ideally represent only receipts which are yet to be invoiced and invoice quantity yet to be received. However, possibly due to reasons discussed above, the balance may be inaccurate and therefore should be reviewed and reconciled. This task is referred to as accrual reconciliation. Accrual reconciliation involves extracting accounting reports, manually examining each purchase order, and manually clearing balances where there is no major error. The task of accrual reconciliation is thus a non-value adding and time consuming activity.

The valuation of inventory delivered to a warehouse is based on provisional accrual accounting, which uses the price in the POD if an invoice corresponding the POD has not yet been entered into the system. However, the final price paid to the supplier may be different from the one tentatively agreed upon or estimated in the purchase order document. Thus, there is potentially a need to re-value the inventory to reflect the final price paid on the supplier invoice, depending on inventory accounting policies. Also, after the purchase order has been finally paid to the supplier, the un-cleared balance in the accrual account should be cleared and the inventory should be re-valued to reflect the final price paid to the supplier.

Thus, in typical PTP accounting, manual account reconciliation must be performed to clear accrual account balances where the purchase has been settled, and to reconcile an invoice price paid to a supplier that is different from the purchase order price. This manual process can be very time consuming and prone to human error.

SUMMARY OF THE INVENTION

One embodiment is a system for reconciling purchase order documents each having an associated accrual account. The system selects a plurality of purchase order documents for which the accrual account is non-zero. The system then filters these purchase order documents by applying a set of business rules. Based on the filtering, a list of purchase order documents is obtained for which the accrual account should be cleared. The system records the list of purchase order documents in a database. The accrual accounts are then automatically cleared.

DETAILED DESCRIPTION

Systems and methods in accordance with an embodiment are directed to a reconciliation engine for accrual accounts associated with purchase orders. When an organization purchases supplies or products, those products are delivered to the organization's warehouse and a bill of receipt is obtained. This begins a series of business events that cause a series of credits and debits to an account, referred to as an accrual account, that is maintained for the purchase order for those products and subsequent storage in inventory. The reconciliation engine uses a set of accounting or business rules to analyze the purchase order and associated business events to determine if an accrual account can be closed. That is, the balance in the account is cleared and the purchase order is deemed complete. An interface is also provided to reverse the automatic clearance if needed, as well as to adjust accrual accounts manually.

Figure 1:
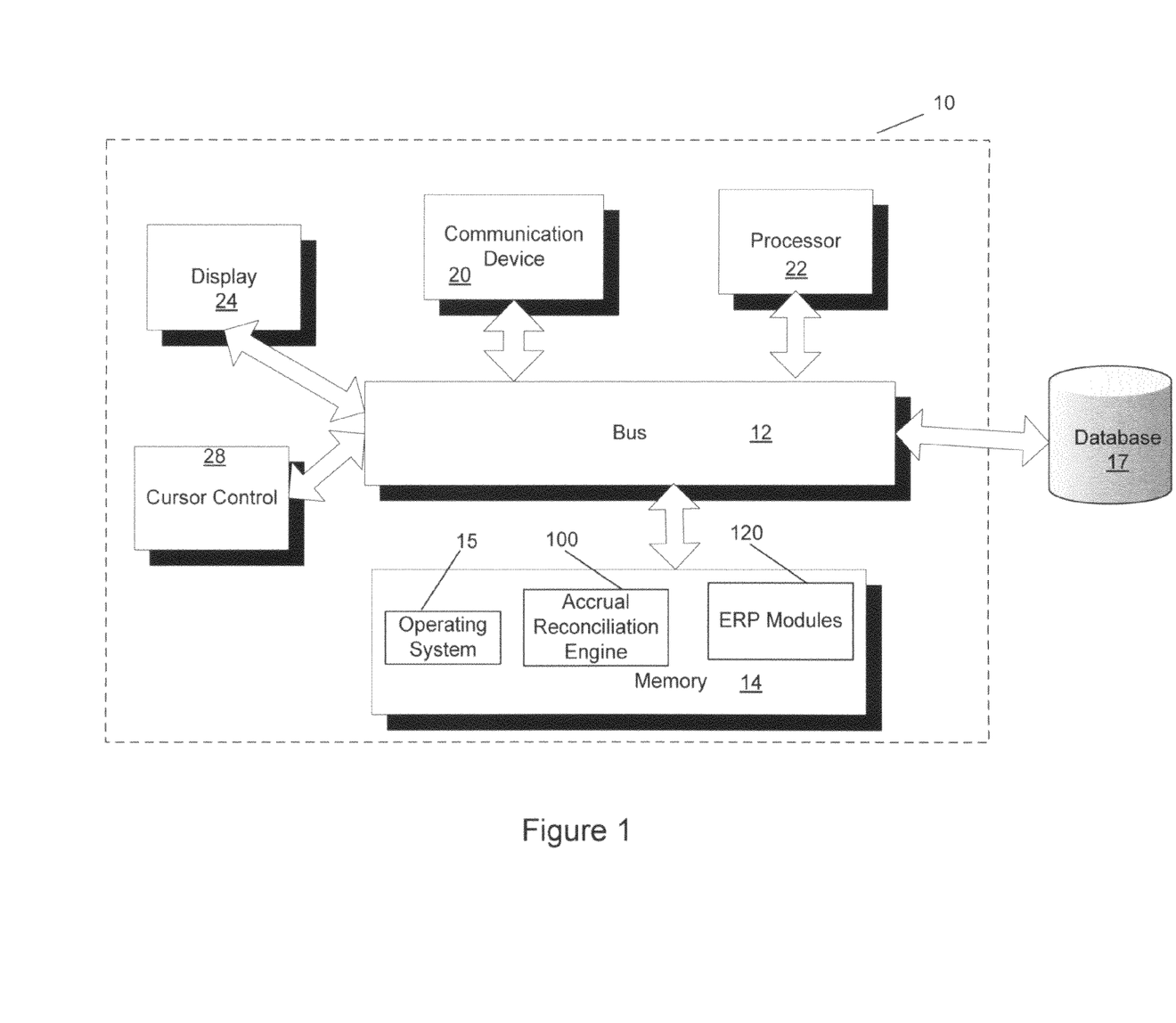
FIG. 1 is a block diagram of a system that can implement an accrual account reconciliation system in accordance with an embodiment.

FIG. 1 is a block diagram of a system 10 that can implement an embodiment of an accrual account reconciliation system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen or mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include an accrual reconciliation engine 100, described in greater detail below, and other enterprise resource planning ("ERP") modules 120. System 10 may further be coupled to a database 17 for storing additional data.

Figure 2:
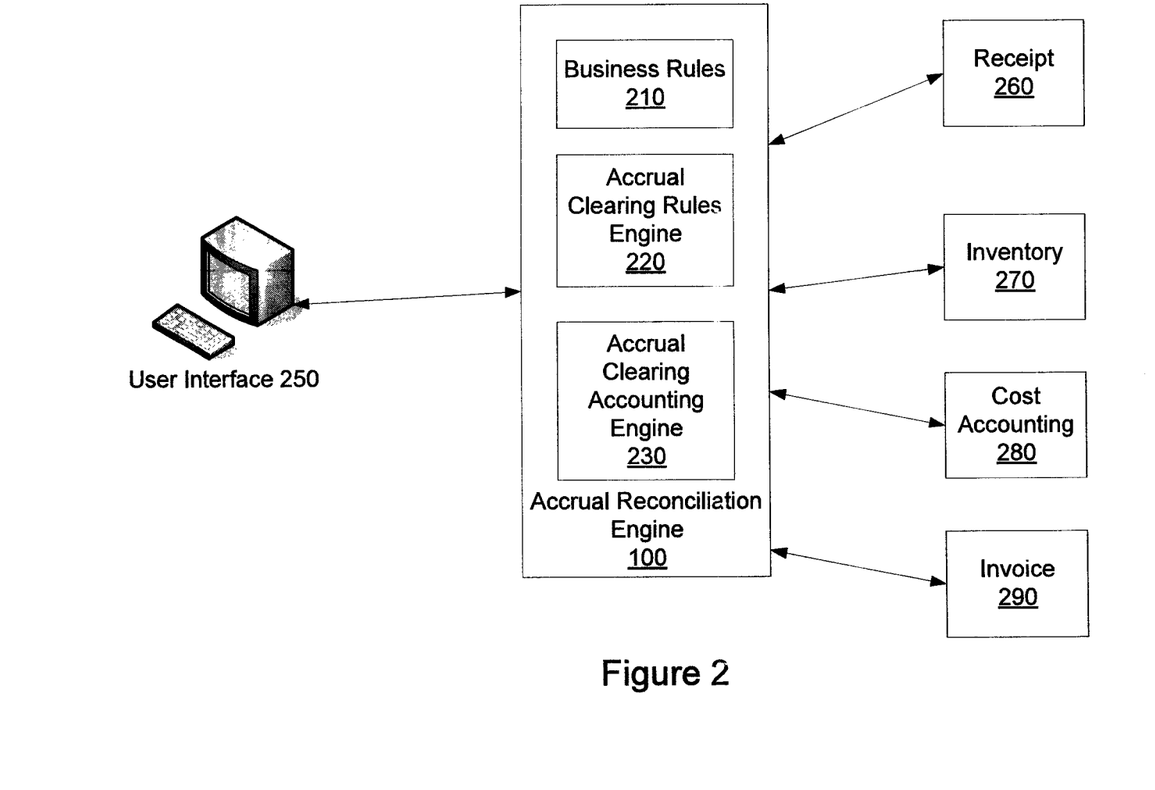
FIG. 2 illustrates a logical diagram of an accrual reconciliation system in accordance with an embodiment.

FIG. 2 illustrates a block diagram of an accrual reconciliation system 200 in accordance with an embodiment. Accrual reconciliation system 200 includes accrual reconciliation engine 100, user interface 250 for defining business rules and extracting reconciliation reports using accrual reconciliation engine 100, and other ERP modules such as a receipt module 260 for managing purchase order ("PO") transaction receipts, returns, and delivery to warehouse; an inventory module 270 for managing PO invoices and debit and credit memos; a cost accounting module 280 for managing inventory valuation; and an invoice module 290 for managing invoices.

A purchase order document ("POD") is a record, electronic or paper, of business events and corresponding debits and credits to the associated accrual account that allow organizations to audit the completeness of a purchase order. Accrual reconciliation engine 100 includes business rules 210 for filtering PODs to determine which accrual account that can be cleared based on accounting rules represented by business rules 210. Business rules 210 may be a part of accrual reconciliation engine 100, or may be stored externally such as in database 17 of FIG. 1. Business rules 210 include a set of business attributes that cover a variety of variables influencing the PTP business process. The business attribute variables include but are not limited to: supplier; supplier site; age of the last receipt; age of the last invoice; the absolute balance in the accrual account; the percentage of accrual on the PO amount; the percentage that the account has been under-invoiced; the percentage that the account has been over-invoiced; the PO status (e.g., closed, complete, reversed); the final match of the invoice (an invoice has been received for all receipts of the PO); the PO match option; and item code or category for the goods purchased. For example, consider the following business rule for an accrual account:

Rule A: Business Unit: XYZ
Match All of the following
Supplier: ABC Inc.
Purchase Order Status: CLOSED
Balance in Accrual: Less Than USD 1000

Rule A implies that when a PO is in "Closed" status and the supplier in the PO is "ABC Inc." and the accrual balance is less than US $1,000, that PO is deemed as completed and finally settled. Thus, any balance in the accrual account is not a true balance and should be cleared and absorbed into inventory cost.

A typical example is that as time passes, the account balance threshold increases. Thus, greater amounts would be cleared for older balances than for younger balances. Another example rule may be:

Rule B
Business_Unit in "XYZ"
Match any of the following
(Item_Category in "123" and PO STATUS='FINALLY CLOSED)
(AMOUNT<$2000 and TRANSACTION AGE>3 weeks)

Thus, if the business unit is "XYZ" and the item category is "123, with PO Status as Finally Closed" the accrual account balance should be cleared. Or, if the Business unit us "XYZ", the balance amount is less than $2000 and the transaction age is greater than three weeks, the accrual account balance should be cleared.

Figure 4:
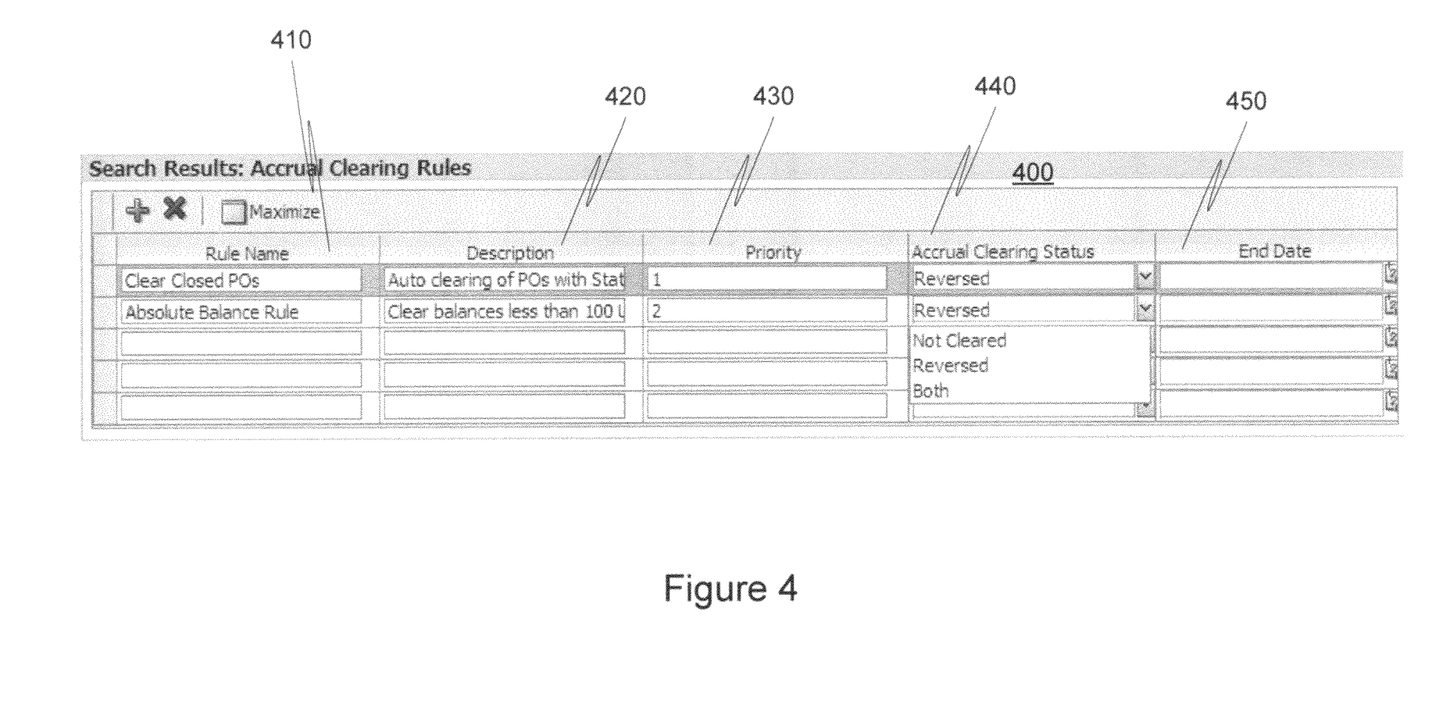
FIG. 4 illustrates an example search results UI displaying a subset of business rules in accordance with an embodiment.

Accrual reconciliation engine 100 further includes an accrual clearing rules engine 220. Accrual clearing rules engine 220 validates PO information from other ERP modules 260, 270, 280 against business rules 210, flags applicable POs as 'Complete,' and marks them eligible for clearing. Accrual clearing rules engine 220 may be scheduled to run at fixed intervals of time, at the end or beginning of each day, or on demand. Accrual reconciliation engine 100 further includes accrual clearing accounting engine 230. Accrual clearing accounting engine 230 selects POs flagged as due for clearing and clears the balance in the accrual account as well as re-values the inventory quantity delivered through the PO. Table 2 illustrates example accounting events created by accrual clearing accounting engine 230 in accordance with an embodiment.

cleared, accrual balances that were cleared but reversed by a user (explained below), or both.

Figure 5:
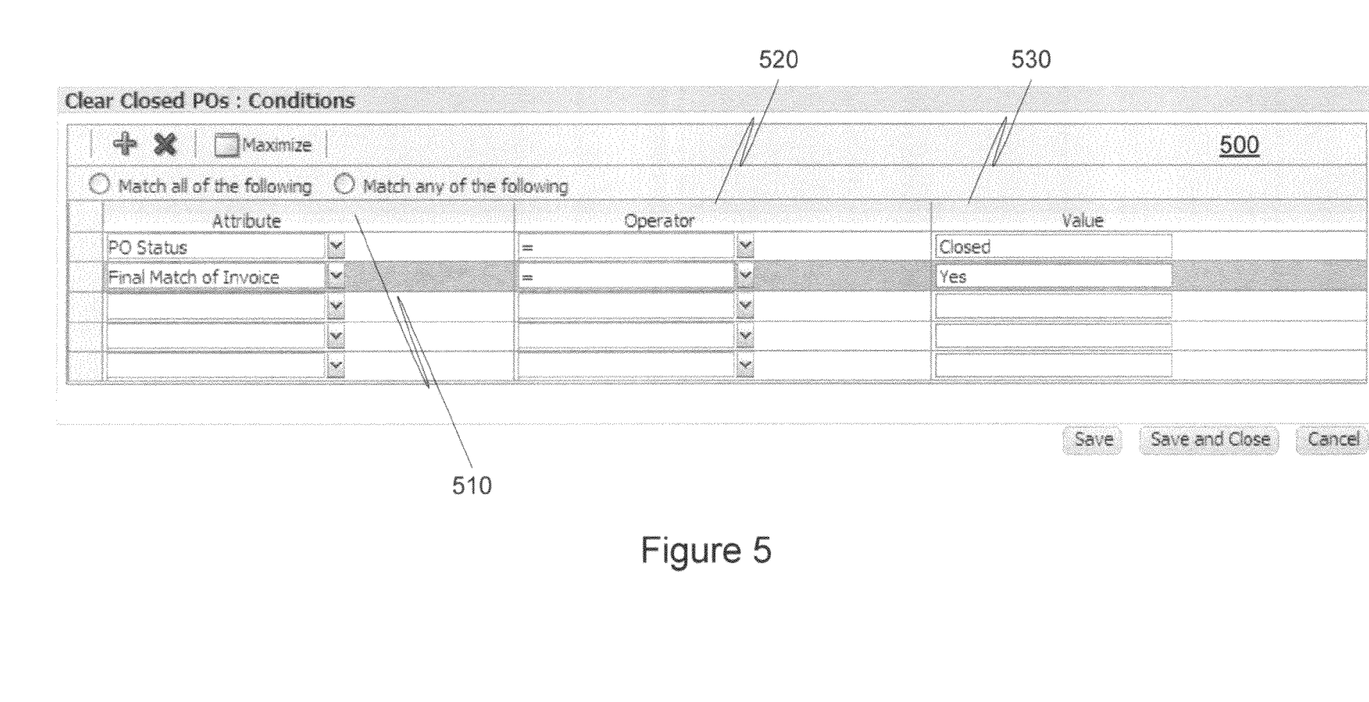
FIG. 5 illustrates an example rule definition UI for defining rule conditions in accordance with an embodiment.

FIG. 5 illustrates an example rule definition UI 500 for defining rule conditions in accordance with an embodiment. The rules definition UI 500 is spawned by clicking on a particular rule name from FIG. 4. Rule conditions are defined by selection of an attribute from attribute menu 510, selecting an operator for the condition statement from operator menu 520, and entering a value 530 for which the condition is satisfied. In the example rule definition UI 500, the rule "Clear Closed POs" is satisfied when the PO status is "Closed" and the Final Match of Invoice is "Yes." That is, the PO status is closed when a final match of receipts to invoices has been made. When this rule is applied, the accrual balances for all POs satisfying the rule will be marked as eligible for clearing. In defining rule conditions, the user may specify that all or any of the conditions must be satisfied for that rule.

Figure 6:
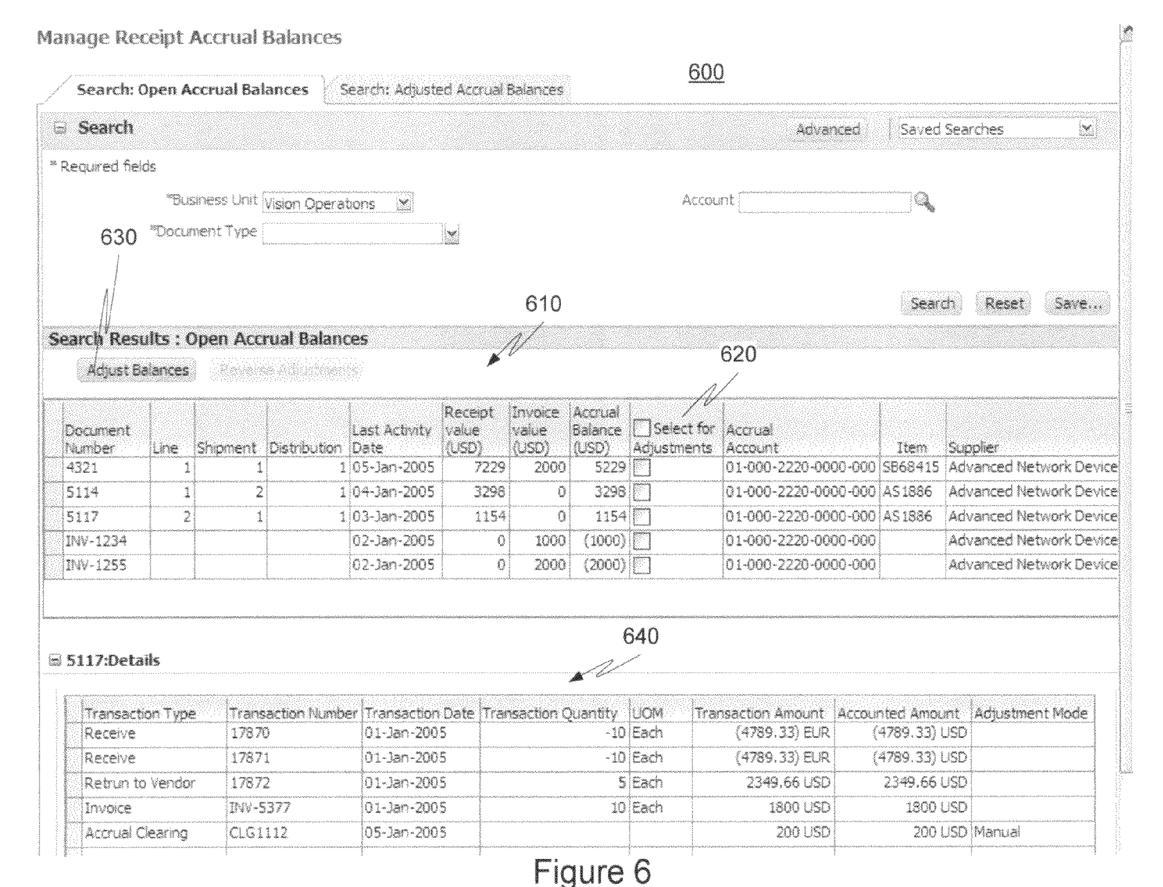
FIG. 6 illustrates a manual accrual adjustment UI in accordance with an embodiment

The automatic reconciliation performed by accrual reconciliation engine 100 reduces the need to review the accrual balances and reconcile them through manual intervention. However, situations may still occur where such manual intervention is desired. Thus, accrual reconciliation engine 100 allows a user to view the accrual status of POs and take appropriate actions. FIG. 6 illustrates a manual accrual adjustment UI 600 in accordance with an embodiment. The manual accrual adjustment UI 600 provides the user with report 610 of POs, including the POD number, activity date, receipt value, invoice value, accrual balance, accrual account number, item number, and supplier. Report 610 includes accrual adjustment column 620 for selecting POs for manual adjustment. Adjust balances button 630 allows the user to adjust the accrual balances of the selected POs manually. Details section 640 may contain information about a PO, including transactions such as receipts, invoices, returns, and

TABLE 2

| Event | Dr/Cr | Account | Explanation | ERP Module |
|---|---|---|---|---|
| Accrual Clearing | Dr/Cr | Receiving Inspection | Un-cleared balance in accrual account for the purchase order. Debit or credit is based on nature of balance | Inventory module Receipt module |
| | Dr/Cr | Supplier Accrual | Un-cleared balance in accrual account for the purchase order. Debit or credit is based on nature of balance | |
| Cost Adjustment | Dr/Cr | Inventory | Propagation of cleared balance in accrual to inventory valuation | Inventory module Cost Accounting module |
| | Dr/Cr | Receiving Inspection | Wash the receiving inspection | |

Figure 3:
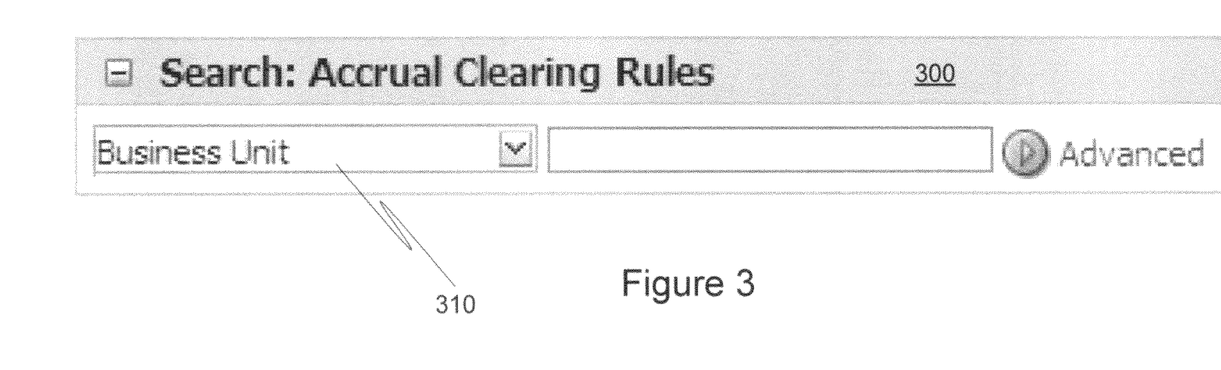
FIG. 3 illustrates an example search user interface ("UI") for searching for a set of business rules in accordance with an embodiment.

FIG. 3 illustrates an example search user interface ("UI") 300 for searching for a set of business rules in accordance with an embodiment. Search UI 300 includes drop down menu 310 for selecting a criteria to search against. For example, a user may select to search for rules applicable to a particular business unit, having a specific name, or based on rule name, rule status, rule attribute, or rule description.

FIG. 4 illustrates an example search results UI 400 displaying a subset of business rules 210 in accordance with an embodiment. For each rule, search results UI includes rule name 410, description 420 describing the rule in plain English, priority 430 indicating priority over other rules, accrual clearing status 440 (e.g., reversed, not cleared, both), and end date 450 indicating when the rule should no longer be applied, if any. Accrual clearing status 440 indicates that the rule is applicable to accrual balances that have not been adjustments, as well as the date, quantity, amount value, and adjusted amount value for those transactions.

Figure 7:
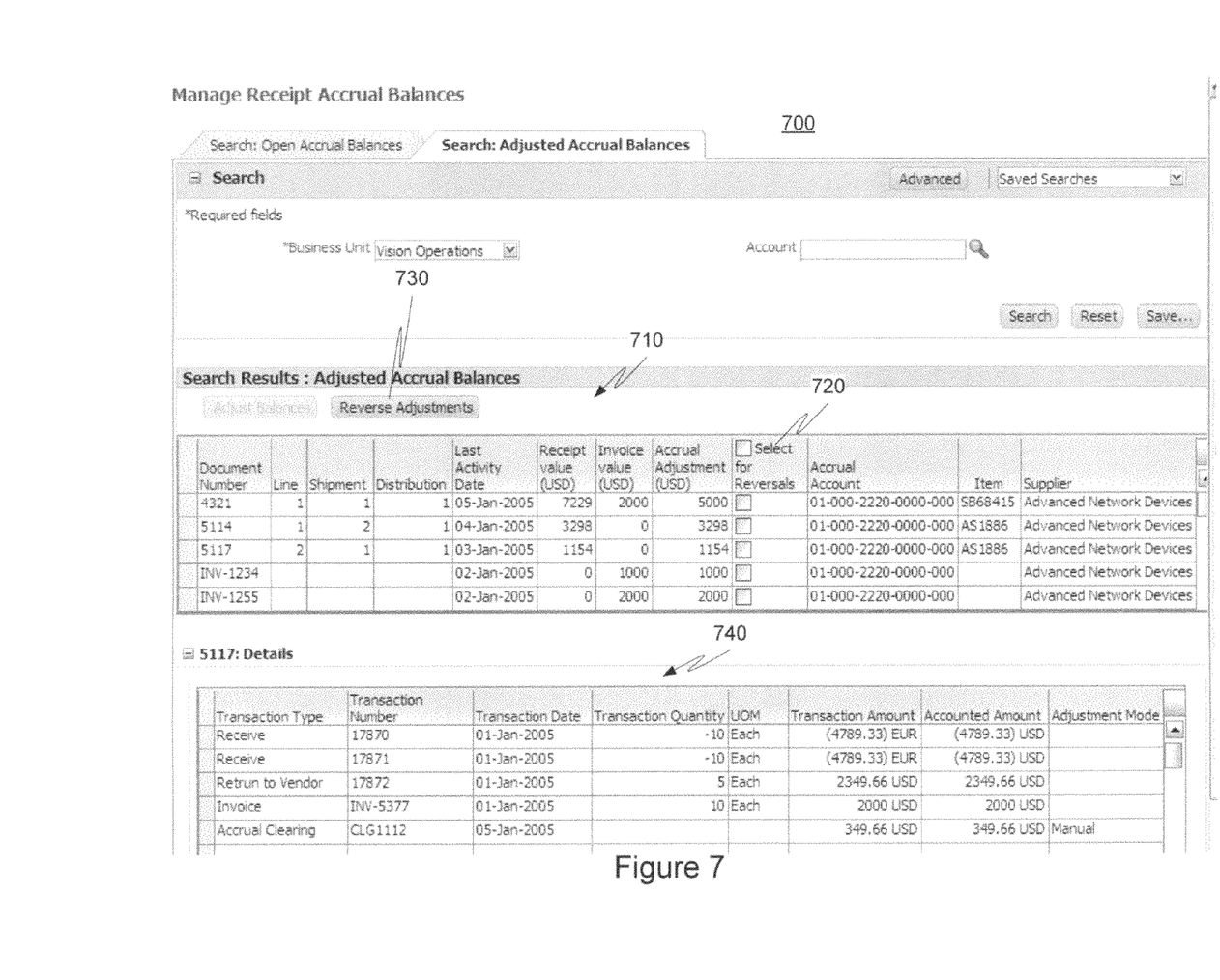
FIG. 7 illustrates an example reverse adjustments UI in accordance with an embodiment.

In some instances, a new transaction may happen for POs already cleared by the accrual clearing process. A user may thus want to reverse the past automatic adjustment. Accordingly, accrual reconciliation engine 100 allows the user to reverse the automatically cleared accrual balances. FIG. 7 illustrates an example reverse adjustments UI 700 in accordance with an embodiment. Reverse adjustments UI includes a report 710 that is similar in substance to report 610. Report 710 includes a reverse adjustment column 720 for selecting POs for adjustment reversal. The selected POs are reverse by clicking reverse adjustments button 730. Details section 740 may contain information about a PO, including transactions such as receipts, invoices, returns, and adjustments, as well as the date, quantity, amount value, and adjusted amount value for those transactions.

Accrual reconciliation engine 100 further reconciles the value of inventory at the final price paid to the supplier to ensure a true reflection of inventory values. Accrual reconciliation engine 100 automatically creates adjustment entries that revalue the receiving inspection and the inventory valuation for goods in the receiving bay and goods in the warehouse respectively. The inventory is thus valued at the true cost of acquisition, which can be mathematically stated as Invoice Value divided by Quantity Delivered, rather than the cost stated on the PO. Table 3 illustrates the accounting events associated with revaluation:

TABLE 3

| Event | Dr/Cr | Account | Explanation | ERP Module |
|---|---|---|---|---|
| Invoice Adjustment | Dr | Receiving Inspection | Difference between original PO price and the final invoice price | Inventory/Receipt Accrual Accounting System |
| | Cr | Invoice Price Adjustment | Difference between original PO price and the final invoice price | |
| Cost Adjustment | Dr | Inventory | Difference in acquisition cost due to use of invoice value instead of PO price. | Inventory/Cost Accounting System |
| | Cr | Receiving Inspection | Wash the Receiving inspection | |

Figure 8:
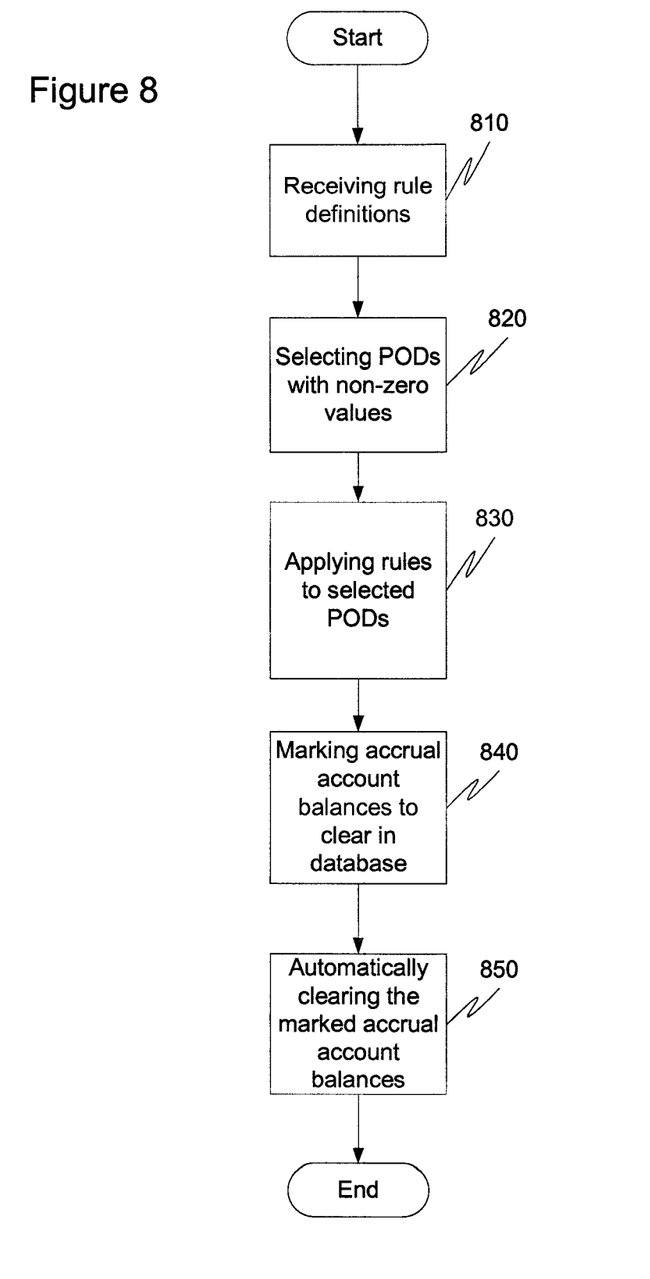
FIG. 8 illustrates a flow diagram of the functionality of accrual reconciliation engine in accordance with an embodiment.

FIG. 8 illustrates a flow diagram of the functionality of accrual reconciliation engine 100 in accordance with an embodiment. In one embodiment, the functionality of the flow diagram of FIG. 8 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. A user first creates business rules using user interface 250 (including search UI 300, search results UI 400, and rule definition UI 500) to define a set of business rules (e.g., business rules 210) for determining which accrual accounts can be cleared (810). Accrual reconciliation engine 100 then selects POD business events for which the associated accrual account is non-zero (820). Accrual reconciliation engine 100 then filters the selected PODs by applying the defined business rules to determine which accrual accounts can be cleared (830). Next, accrual reconciliation engine 100 marks the accrual accounts as ready for accounting, for example, by storing a list of the accounts to be cleared in a database (840). Finally, accrual reconciliation engine 100 automatically clears the marked accrual accounts (850). Table 4 illustrates the accounting events associated with this process:

TABLE 4

| Event | Dr/Cr | Account | Explanation | ERP Module |
|---|---|---|---|---|
| Accrual Clearing | Dr/Cr | Receiving Inspection | Un-cleared balance in accrual account for the purchase order. Dr or Cr is based on nature of balance | Inventory/Receipt Accrual Accounting System |
| | Dr/Cr | Supplier Accrual | Un-cleared balance in accrual account for the purchase order. Dr or Cr is based on nature of balance | |
| Cost Adjustment | Dr/Cr | Inventory | Propagation of cleared balance in accrual to inventory valuation | Inventory/Cost Accounting System |
| | Dr/Cr | Receiving Inspection | Wash the Receiving inspection | |

As disclosed, an accrual reconciliation system in accordance with an embodiment includes accrual reconciliation engine 100 communicating with receipt, inventory, cost accounting, and other ERP modules to obtain purchase order data and determine which purchase orders have an associated accrual account that is non-zero. Accrual reconciliation engine 100 can then apply business rules 210 to the purchase order data to determine which accrual accounts may be cleared, and automatically clear them. Accordingly, the amount of purchase orders requiring the attention and manual intervention of users is drastically reduced. Moreover, the risk of human error in discovering accrual account discrepancies is limited.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer implemented method of reconciling a plurality of purchase order documents, each having an associated accrual account, comprising:
   selecting, by an accrual reconciliation engine, a plurality of purchase order documents for which the accrual account is non-zero;
   filtering the plurality of purchase order documents by applying a set of business rules, wherein the business rules comprise a purchase order document attribute, an operator, and a value to which to compare the purchase order document attribute in order to satisfy the business rule;
   obtaining, based on the filtering, a list of purchase order documents for which the accrual account should be cleared;
   recording the list of purchase order documents in a database;
   automatically clearing accrual accounts associated with the list of purchase order documents; and
   displaying a reverse adjustment user interface programmed to reverse a past automatic clearing of an accrual account, wherein the reverse adjustment user interface comprises a reverse adjustment selector for selecting purchase order documents for which the clearing of the accrual account should be reversed.

2. The method of claim 1, further comprising displaying in a user interface a list of purchase order that did not satisfy the set of business rules, wherein the user interface includes a mechanism for manually adjusting an amount in a corresponding accrual account.

3. The method of claim 1, further comprising providing a user interface programmed to receive a business rule definition and create a business rule from the business rule definition.

4. The method of claim 1, wherein the purchase order document attribute is one of: supplier; supplier site; age of last receipt; age of last invoice; absolute balance of accrual account; percentage of accrual on a purchase order amount; percentage of under-invoice; percentage over-invoice; purchase order status; item code; and item category.

5. The method of claim 1, further comprising:
   receiving goods based on a purchase order price;
   provisionally valuing an inventory based on the purchase order price;
   determining an invoice price to be different from the purchase order price; and
   applying a new value to the inventory based on the invoice price.

6. A computer-readable medium having instructions stored thereon that, when executed by a processor, cause the processor to reconcile a plurality of purchase order documents each having an associated accrual account by:
   selecting a plurality of purchase order documents for which the accrual account is non-zero;
   filtering the plurality of purchase order documents by applying a set of business rules, wherein the business rule comprises a purchase order document attribute, and operator, an a value to which to compare the purchase order document attribute in order to satisfy the business rule;
   obtaining, based on the filtering, a list of purchase order documents for which the accrual account should be cleared;
   recording the list of purchase order documents in a database;
   automatically clearing accrual accounts associated with the list of purchase order documents; and
   displaying a reverse adjustment user interface programmed to reverse a past automatic clearing of an accrual account, wherein the reverse adjustment user interface comprises a reverse adjustment selector for selecting purchase order documents for which the clearing of the accrual account should be reversed.

7. The computer-readable medium of claim 6, further comprising displaying in a user interface a list of purchase order that did not satisfy the set of business rules, wherein the user interface includes a mechanism for manually adjusting an amount in a corresponding accrual account.

8. The computer-readable medium of claim 6, further comprising providing a user interface programmed to receive a business rule definition and create a business rule from the business rule definition.

9. The computer-readable medium of claim 6, wherein the purchase order document attribute is one of: supplier; supplier site; age of last receipt; age of last invoice; absolute balance of accrual account; percentage of accrual on a purchase order amount; percentage of under-invoice; percentage over-invoice; purchase order status; item code; and item category.

10. The computer-readable medium of claim 6, further comprising:
    receiving goods based on a purchase order price;
    provisionally valuing an inventory based on the purchase order price;
    determining an invoice price to be different from the purchase order price; and
    applying a new value to the inventory based on the invoice price.

11. A system for reconciling inventory value, comprising:
    a memory storing instructions for
       selecting a purchase order record for which an associated accrual account is non-zero,
       applying a set of business rules to the purchase order record to determine that the associated accrual account should be cleared,
       automatically clearing the associated accrual account,
       determining an invoice price in the purchase order record to be different from a purchase order price in the purchase order record,
       applying an updated value to an inventory based on the invoice price;

displaying a reverse adjustment user interface programmed to reverse a past automatic clearing of an accrual account, wherein the reverse adjustment user interface comprises a reverse adjustment selector for selecting purchase order documents for which the clearing of the accrual account should be reversed; and a processor executing the instructions, wherein the business rule comprises a purchase order document attribute, an operator, and a value to which to compare the purchase order document attribute in order to satisfy the business rule.

12. A system for reconciling a plurality of purchase order documents, each having an associated accrual account, comprising:

means for selecting a plurality of purchase order documents for which the accrual account is non-zero;

means for filtering the plurality of purchase order documents by applying a set of business rules, wherein the business rule comprises a purchase order document attribute, an operator, and a value to which to compare the purchase order document attribute in order to satisfy the business rule;

means for obtaining, based on the filtering, a list of purchase order documents for which the accrual account should be cleared;

means for recording the list of purchase order documents in a database;

means for automatically clearing accrual accounts associated with the list of purchase order documents; and means for displaying a reverse adjustment user interface programmed to reverse a past automatic clearing of an accrual account, wherein the reverse adjustment user interface comprises a reverse adjustment selector for selecting purchase order documents for which the clearing of the accrual account should be reversed.

13. The system of claim 11, wherein the purchase order document attribute is one of: supplier; supplier site; age of last receipt; age of last invoice; absolute balance of accrual account; percentage of accrual on a purchase order amount; percentage of under-invoice; percentage over-invoice; purchase order status; item code; and item category.

* * * * *

UNITED STATES PATENT AND TRADEMARK OFFICE
CERTIFICATE OF CORRECTION

PATENT NO. : 8,484,102 B2  
APPLICATION NO. : 12/392159  
DATED : July 9, 2013  
INVENTOR(S) : Goodbody et al.

Page 1 of 1

It is certified that error appears in the above-identified patent and that said Letters Patent is hereby corrected as shown below:

On the Title page, item (73), under Assignee, delete "AZ" and insert -- CA --, therefor.

In the Specifications:

In column 3, line 33, delete "embodiment" and insert -- embodiment; --, therefor.

In the Claims:

In column 10, line 14, in Claim 6, delete "an a" and insert -- a --, therefor.

Signed and Sealed this  
Fifteenth Day of October, 2013

Teresa Stanek Rea  
*Deputy Director of the United States Patent and Trademark Office*